July 14, 1931.   H. LUNDQUIST   1,814,394
GASOLINE GAUGE
Filed Jan. 7, 1927
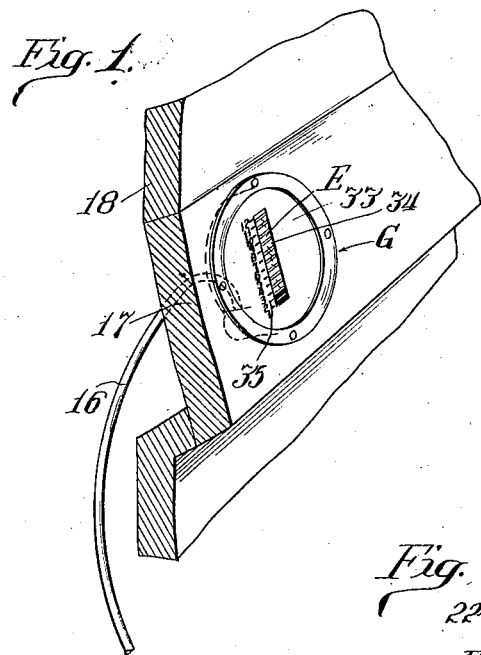
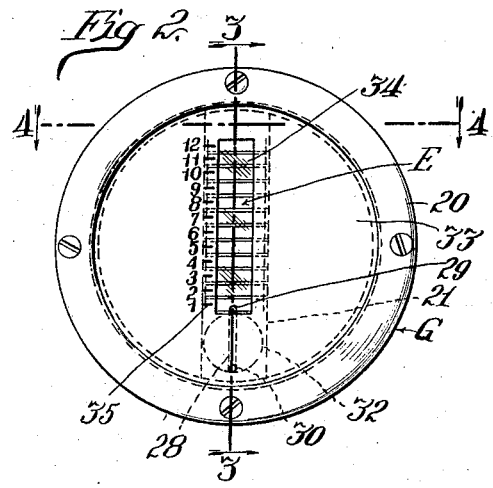
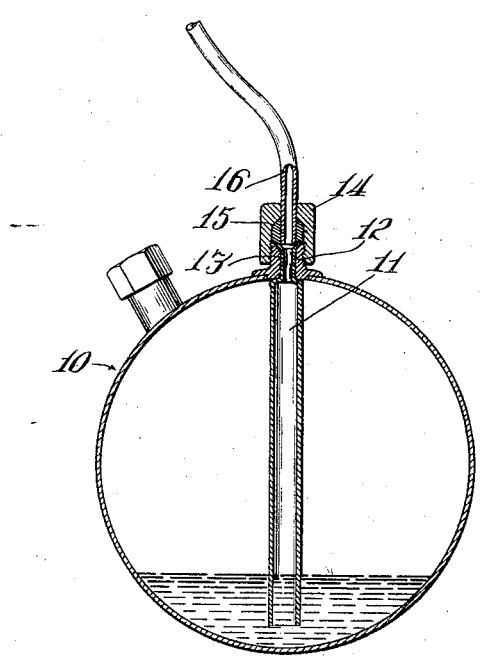
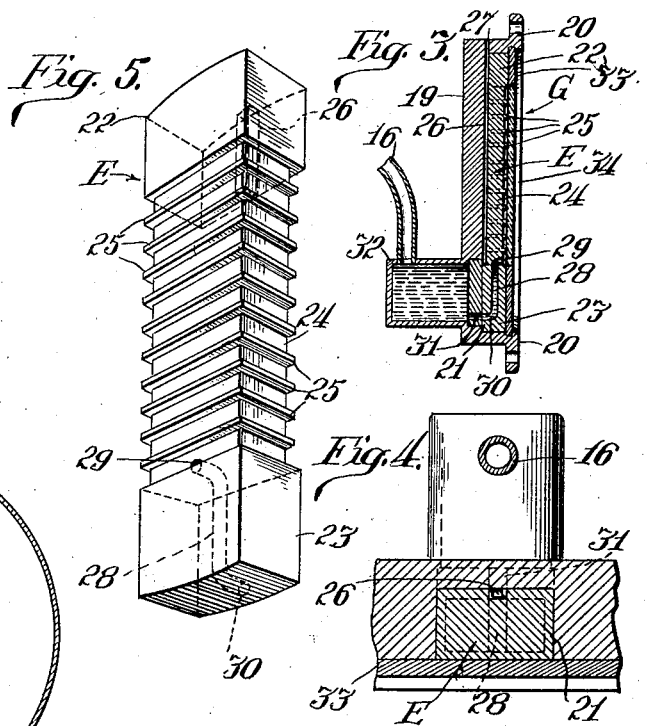
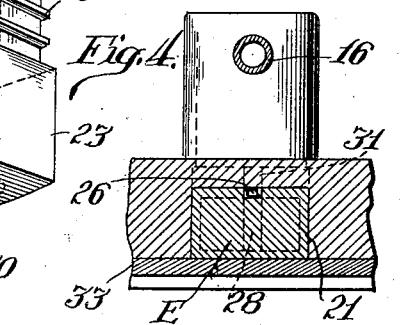
Inventor
*Hans Lundquist*
*Daniel P Brennan.*
Attorney Patented July 14, 1931

1,814,394

UNITED STATES PATENT OFFICE

HANS LUNDQUIST, OF CHICAGO, ILLINOIS

GASOLINE GAUGE

Application filed January 7, 1927. Serial No. 159,590.

This invention relates to improvements in gasoline gauges.

It is an object of the invention to provide a distributor element which serves for separating an indicating liquid into a plurality of clearly discernible branches, to facilitate the reading of the gauge, and to indicate at a glance the approximate contents of a fuel tank remote from the gauge.

Another object of the invention is to utilize a pressure fluid, as for instance air for the purpose of displacing an indicating liquid and to render this displacement proportionate to the amount of fuel contained in the tank. It is also an object of the invention to provide a gauge with a very simple distributor element which can be manufactured at an extremely low expense, but can readily be replaced whenever desired.

With these and numerous other objects in view an embodiment of the invention is described in the following specification, in which reference is made to the accompanying figures in the drawings:

Fig. 1 is partly a perspective and partly a sectional view of the gauge connected with a gasoline tank;

Fig. 2 is a front elevational view of the gauge itself;

Fig. 3 is a vertical sectional view on line 3—3 of Fig. 2;

Fig. 4 is a horizontal sectional view on line 4—4 of Fig. 2, on a larger scale, and Fig. 5 is a perspective view of the distributor on a larger scale.

The gasoline tank 10 is shown as a cylindrical tank, although it may have any desired cross section. It may be equipped with the necessary valves and openings for filling or tapping the tank and may be connected with the carburetor in any approved way. A pipe 11 is secured rigidly within this tank, as for instance, by the lug 12 which is fastened to the outside of the tank and which has an opening wherein a reduced portion 13 of the pipe 11 is seated, so as to preclude the entrance of air through the opening of the lug. The latter is threaded on its outer surface to receive an adjustable cap nut 14 which has a packing 15 in engagement with a conduit 16 in communication with the reduced portion 13 of the pipe 11.

The conduit, which may be flexible or rigid, extends from the fuel tank to the gauge G. This instrument is secured at a point where it can be readily observed by the attendant of the engine or by the driver of the automobile. As shown in Fig. 1 the gauge G is mounted on a board 17 which is a portion of the dash board 18 of an automobile, the board 17 being preferably that structure on which other instruments, switches or locks are mounted.

The gauge comprises a casing in the form of a circular plate 19 with an annular flange 20 whereby it may be fastened to the board 17. This plate has a substantially straight groove 21 extending in diametrical direction and adapted to receive the distributor element E. This distributor element is constructed as a prismatic body such as a block having two head portions 22 and 23 and a somewhat reduced intermediate portion 24 which in the embodiment illustrated is of rectangular cross section. Ribs or projections 25 suitably spaced from each other are provided on the prismatic body to form channels, and each of these ribs extends substantially entirely about the portion 24, each of the ribs having a gap on one side of the portion 24 of the body, and all of the gaps are in alignment whereby a practically continuous groove 26 is formed on this side of the body 24.

This groove is continued through the head 22 of the distributor element and also is continued by a bore 27 through the plate 19 of the gauge. The head 23, however, is provided with a passageway 28 communicating at one end with a bore 29, which terminates in the space between the lowest rib 25 and the top surface of the head 23, the other end of the passage way 28 being in communication with a short bore 30 which leads to the rear surface of the head. As shown in Fig. 3 this bore 30 is in communication with an opening 31 leading through the plate 19 and communicating with a collector receptacle 32 with which also the conduit 16 is connected.

A closure plate 33 is placed directly over the circular body 19 of the gauge and that portion of the closure plate 33 which overlies the reduced part 24 of the distributor E has an opening in which a glass plate 34 is inserted. Gradation marks 35 are disposed on the cover plate 33 adjacent the window 34, the spacing of these marks preferably corresponding to the spacing of the ribs 29 or of the grooves formed by these ribs. The cover plate 33 may be secured in position in any approved manner—such, for instance, by a suitable adhesive, the cover plate being sufficiently resilient to permit of its being sprung into position as shown. The glass panel or window 34 may be secured in the opening provided in the plate 33 by a suitable waterproof adhesive similarly to the securement of the cover plate 33.

The collector receptacle 32 is filled with an indicating liquid, as for instance mercury, or with some other liquid of conspicuous color, contrasting with the color of the distributor E. The latter may be black or may be made of material which can be painted in any desired color.

In the operation of the device the fuel introduced into the tank 10 will cause a displacement of the air contained in said tank through the pipe 10 and conduit 16. This air or any other pressure fluid will act upon the indicator liquid in the collector receptacle 32 by forcing the same through the bore 31 and passage ways 30, 28 and 29 into the lowermost groove of the distributor E. Owing to the peculiar construction of the distributor element the liquid will be spread over a relatively large surface, so as to become clearly discernible to the attendant. The projections on the distributor element separated by grooves will have the effect of dividing this indicator liquid into a plurality of branches which are clearly separated from each other and which extend parallel to each other. The indicator liquid having been spread in these branches in the form of a thin film will expel the air from the grooves through the bore 26 in the gauge and with the recession of the fuel in the tank 10 the atmospheric air will enter through the same bore to cause an equivalent recession of the indicator liquid back to the receptacle 32. The provision of the ribs 25 on the distributor E will also act in the nature of baffles and thereby prevent excessive fluctuation of the mercury or the like in the gauge whereby the latter will display the indicator liquid at a uniform level varying only with the definite increase or decrease respectively of the fuel in the tank 10.

I claim:

1. In a gauge of the character described, a plate having a recess, a distributor seated in said recess, the distributor having means for dividing a pressure actuated indicating liquid into a plurality of branches exposed at one side, a cover plate sealing the exposed side of said distributor and retaining the latter in position, and a window in said cover plate overlying and sealing the exposed side of said distributor.

2. In a device of the character described, in combination, a level indicator including means for distributing a pressure actuated liquid over a relatively large surface, said surface having thereon a plurality of superposed projections affording parallel spaced channels each having adjacent portions thereof exposed to view and having major portions thereof isolated from each other and said projections being notched to form passageways for connecting the unexposed portions of said channels.

3. A device for indicating liquid level comprising a plate provided with a polygonal recess, and means for distributing the indicating liquid comprising a polygonal body adapted to snugly fit in said recess and having one exposed side, said body having a plurality of encompassing spaced parallel ribs which are provided with alined recesses, a cover plate, and a transparent plate carried thereby disposed over the exposed side of said body and engaging the adjacent ribs.

4. In a gauge of the character described, a distributor element provided with means for dividing a portion of a pressure actuated indicating liquid into a plurality of equal sized horizontal parallel branches at different heights having each a portion thereof exposed to view.

5. In a liquid level gauge, an indicator including a block having a series of transverse communicating exposed grooves around said body so connected that a liquid rising therein must completely fill each groove in succession before entering the next succeeding groove, and a casing for said block.

6. In a liquid level gauge, an indicator including a block having a series of communicating exposed horizontal substantially parallel grooves around said body so connected that a liquid rising therein must completely fill each groove in succession before entering the next succeeding groove, and a casing for said block.

7. In a liquid level gauge, an indicator including a block having a series of communicating exposed substantially horizontal parallel grooves around said body and said block having a substantially continuous groove so establishing communication between the parallel grooves that a liquid rising therein must completely fill each groove in succession before entering the next succeeding groove, and a casing for said block.

8. In a gauge of the character described, a distributor element provided with means for dividing a portion of a pressure actuated indicating liquid into a plurality of horizontal parallel branches at different heights, the branches being of equal surface area and equally spaced from each other.

9. In a level gauge, in combination, a casing having a recess, a liquid distributor mounted therein and having a plurality of spaced parallel horizontal passageways, a source of liquid, said distributor also being provided with openings for placing said passageways in communication with said source of liquid and with each other, and a portion of each of said passageways being exposed to view at one side of said casing.

10. In a gauge of the character described, a distributor element comprising a body portion, equally spaced transverse ribs around said body portion forming channels therein, and said body portion having a passageway therein for pressure actuated indicating fluid communicating with a lower one of said channels.

11. In a gauge of the character described, a circular plate having a diametrical groove, a distributor element seated in said groove, the distributor element comprising a body portion, equally spaced transverse ribs around said body portion forming channels therein, each of said ribs being provided with a gap, and said body portion having a passageway therein for pressure actuated indicating fluid communicating with a lower one of said channels.

12. In a gauge of the character described, a plate having a groove, a distributor element seated in said groove, the distributor element comprising a body portion, equally spaced transverse ribs around said body portion forming channels therein, each of said ribs being provided with a gap, and said body portion having a passageway therein for pressure actuated indicating fluid communicating with a lower one of said channels, the plate having a bore in communication with said gaps.

In testimony whereof I affix my signature at 10 South LaSalle St., Chicago, Illinois.

HANS LUNDQUIST.